US008894483B2

(12) United States Patent
Mooney et al.

(10) Patent No.: US 8,894,483 B2
(45) Date of Patent: Nov. 25, 2014

(54) SELECTIVE GENERATION OF USER REMINDERS FOR GAME CONDITIONS

(75) Inventors: William Henry Kelly Mooney, San Francisco, CA (US); Erik Francis Vanbragt, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 337 days.

(21) Appl. No.: 13/244,897

(22) Filed: Sep. 26, 2011

(65) Prior Publication Data

US 2012/0015720 A1  Jan. 19, 2012

Related U.S. Application Data

(63) Continuation of application No. 12/778,993, filed on May 12, 2010.

(60) Provisional application No. 61/247,392, filed on Sep. 30, 2009.

(51) Int. Cl.
*A63F 9/24* (2006.01)
*G06Q 30/00* (2012.01)
*A63F 13/30* (2014.01)

(52) U.S. Cl.
CPC .......... *A63F 13/12* (2013.01); *A63F 2300/535* (2013.01); *A63F 2300/556* (2013.01); *A63F 2300/636* (2013.01)
USPC ... 463/29; 463/1; 463/25; 463/30; 705/14.12; 705/14.14

(58) Field of Classification Search
USPC ............... 463/29, 1, 25, 30; 705/14.12, 14.14
See application file for complete search history.

(56) References Cited

U.S. PATENT DOCUMENTS

| | | | | |
|---|---|---|---|---|
| 2003/0032476 | A1* | 2/2003 | Walker et al. | 463/25 |
| 2004/0259641 | A1* | 12/2004 | Ho | 463/42 |
| 2009/0222348 | A1* | 9/2009 | Ransom et al. | 705/14 |
| 2010/0056280 | A1* | 3/2010 | Langan et al. | 463/42 |
| 2010/0062840 | A1* | 3/2010 | Herrmann | 463/25 |
| 2010/0203963 | A1* | 8/2010 | Allen et al. | 463/30 |
| 2010/0216553 | A1* | 8/2010 | Chudley et al. | 463/42 |
| 2010/0279764 | A1* | 11/2010 | Allen et al. | 463/25 |
| 2010/0331064 | A1* | 12/2010 | Michelstein et al. | 463/1 |
| 2012/0015722 | A1 | 1/2012 | Mooney et al. | |

OTHER PUBLICATIONS

"Resistor Publications Launches Facebook Platform Application," Jul. 13, 2009.*
"Allow Your Users to Invite Their Friends", Feb. 2, 2008.*

(Continued)

*Primary Examiner* — Xuan Thai
*Assistant Examiner* — Michael Grant
(74) *Attorney, Agent, or Firm* — Schwegman Lundberg & Woessner, P.A.

(57) ABSTRACT

Systems and methods to selectively generate user reminders for game conditions are described. In some embodiments, a method accesses a game condition identifier associated with a game condition for a user of an online game. The method further determines a value associated with the game condition identifier and determines that the user has not performed a particular action required with respect to the game condition based on the value of the game condition identifier. Additionally, the method determines whether to remind the user of the game condition. If so, a reminder associated with the game condition is generated and presented to the user. The reminder includes a user response interface that allows the user to indicate whether the user has performed the game condition. The game condition identifier is updated if a response received from the user indicates that the user has performed the game condition.

19 Claims, 6 Drawing Sheets

(56) References Cited

OTHER PUBLICATIONS

"The Multiply Blog," Jul. 16, 2009.*
Ostrow, Adam, "Raptr Moves Video Games into the Activity Stream Area," Sep. 3, 2008, retrieved on Apr. 28, 2014 from internet URL http://mashable.com/2008/09/03/raptr-video-game-community/.*
"U.S. Appl. No. 12/778,993, Response filed Nov. 29, 2012 to Final Office Action mailed May 31, 2012", 10 pgs.
"U.S. Appl. No. 12/788,993, Examiner Interview Summary mailed Jul. 27, 2012", 3 pgs.
"U.S. Appl. No. 13/244,901, Final Office Action mailed Jul. 13, 2012", 10 pgs.
"U.S. Appl. No. 12/778,993, Non Final Office Action mailed Nov. 30, 2011", 11 pgs.
"U.S. Appl. No. 12/778,993, Response filed Apr. 30, 2012 to Non Final Office Action mailed Nov. 30, 2012", 10 pgs.
"U.S. Appl. No. 13/244,901, Non Final Office Action mailed Feb. 16, 2012", 13 pgs.
"Successful Strategies for Using Social Bookmarking", [Online]. Retrieved from the Internet: <http://www.awomaninbusiness.com/2008/11/successful-strategies-for-using-social-bookmarking> Accessed Jan. 25, 2012, 6 pgs.
"U.S. Appl. No. 12/778,993, Non Final Office Action mailed May 27, 2014", 14 pgs.
"U.S. Appl. No. 13/244,901, Non Final Office Action mailed Jul. 8, 2014", 18 pgs.
"U.S. Appl. No. 13/244,901, Response filed Dec. 6, 2012 to Final Office Action mailed Jul. 13, 2012", 9 pgs.

* cited by examiner

US 8,894,483 B2

SELECTIVE GENERATION OF USER REMINDERS FOR GAME CONDITIONS

CLAIM OF PRIORITY

This application is a continuation of and claims the benefit of priority under 35 U.S.C. §120 to U.S. patent application Ser. No. 12/778,993, filed on May 12, 2010, which claims the benefit of priority under 35 U.S.C. §119(e) to U.S. Provisional Patent Application Ser. No. 61/247,392, filed on Sep. 30, 2009, the benefit of priority of each of which is claimed hereby, and each of which are incorporated by reference herein in its entirety.

TECHNICAL FIELD

The present disclosure generally relates to use and distribution of digital media objects over computer networks, and more specifically to generating game-related reminders based on conditions.

BACKGROUND

Computer games are very popular and have been around for a while. Recently, embedding multiplayer online games into large-scale social networks or other application programming interfaces (APIs) has increased in popularity and has proved to be an effective mechanism for popularizing online games.

For example, the social networking website Facebook.com® has provided an infrastructure in which game developers can build multi-player online games for users to play from within the social network. However, social networking websites may place limits on the degree of control an online game can have over other aspects of the social network. For example, a particular social network may not permit game developers to design games that allow the user to bookmark the game in the user's social network account through the game itself. Therefore, a need exists for a system and method that allows game developers to guide, direct, influence, and instruct desired user behavior from within the game without actually forwarding commands to the social network or API from within the game itself. In certain embodiments, such desired user behavior may be directed towards increasing the accessibility and/or popularity of the game in an online community.

BRIEF DESCRIPTION OF THE DRAWINGS

For a more complete understanding of the present disclosure and its advantages, reference is now made to the following description taken in conjunction with the accompanying drawings, in which like reference numbers indicate like features, and.

DETAILED DESCRIPTION

The following embodiments are described and illustrated with apparatuses, methods, systems, and software which are meant to be examples and illustrative, not limiting in scope. For example, the network environment described below is provided only to illustrate how a particular implementation of the present disclosure might be employed.

Embodiments of the present disclosure are directed toward systems and methods for operating multiplayer online games with reminder dialogs using persistent game condition files to remind users to take certain actions, settings, or game conditions internal and external to the multiplayer online game. Such reminders dialogs can be used to encourage, remind or nudge user behavior. By intermittently or systematically presenting users with a reminder dialog including instructions or diagrams on how to accomplish the desired action or user behavior, game and application developers can guide the behavior of their users to promote product loyalty, return business, increased spending, enrichment of gameplay and enhanced experience thereby increasing the popularity and profitability of the game. In general, reminders are designed to provoke user behavior that a game or application developer may wish to encourage.

Reminders may be used to suggest a variety of desired actions by users of a game. For example, a reminder may direct a user to bookmark, become a "fan," or vote for a game within the context of a social network. Reminders may also request users to invite friends to join a game or participate in some aspect of the game, such as obtaining ingredients for a dish or tasting a prepared dish. Other reminders may remind users to add neighbors or employees, or to assist other users as needed within the game. Reminders may be presented in the form of a progress bar to track completion of game-related tasks such as providing an email address, adding a bookmark, becoming a fan, and granting publishing permissions. Another reminder may be presented upon game startup to disclose game-related items, such as tips, gifts, and game currency, which may encourage further user activity. Other reminders may seek a user's email address to provide direct email reminders. Still other reminders may seek publishing permissions to post activities of a user directly to a social network. Activities that might be posted to a social network include reaching a particular milestone or game level, or making a specific achievement within the context of a game. While various example reminders have been disclosed, it should be understood that various embodiments of the present disclosure may provide reminders for any variety or number of desired user actions. The description and figures provided herein disclose a system and method for generating reminders based on game conditions.

Figure 1:
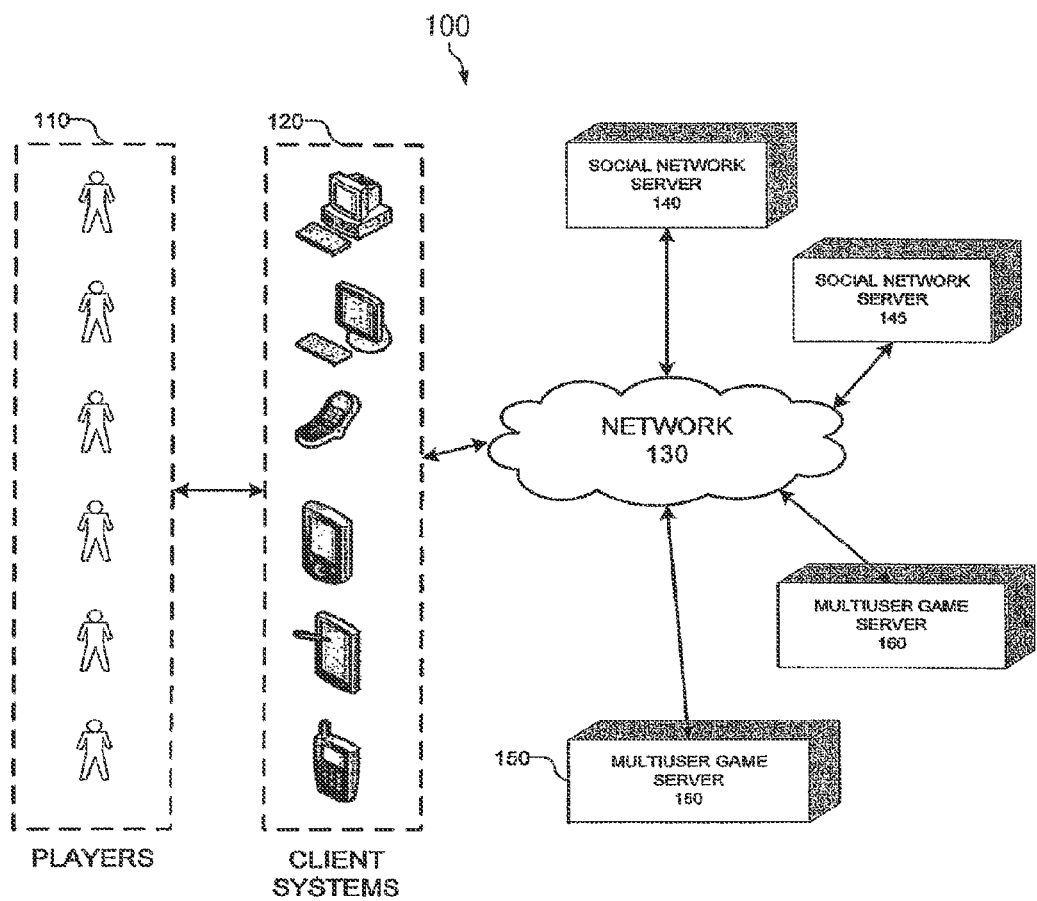
FIG. 1 illustrates a schematic view of an example system that can be used to implement various embodiments of the present disclosure.

FIG. 1 is a block diagram illustrating a system 100 with elements that intemperate to generate reminders to influence a wide variety of user actions. The elements of system 100 can support a number of different operations, including loading a game condition file having game condition identifiers or indicators, determining the value of a game condition identifier or indicator, displaying a reminder dialog interface to present instructions and/or diagrams, receiving a user response, and updating the game condition identifier or indicator based on the user response.

In the illustrated embodiment, system 100 comprises a number of interconnected elements that operate together to facilitate the operation of a multiuser game, including multiple players 110, client systems 120, network 130, and various servers 140, 145, 150, and 160.

As shown, multiple players 110 represent individual users that may access a multiuser game available from a multiuser game server 150 or 160 using client systems 120 over network 130. For example, multiple players 110 may be individual players of an online game such as Zynga CafeWorld or Farmville. Multiple players 110 may also be players of more than one multiuser game. Further, multiple players 110 may use one or more client systems 120 to gain access to multiuser games residing on remote servers accessible through a network infrastructure.

Client systems 120 represent any suitable hardware and controlling logic and/or software encoded on non-transitory computer-readable media for enabling multiple players 110 to access network 130 and play a multiuser game. Client systems 120 may include a personal computer, a smart phone, a mobile phone, a net book, a handheld gaming device or any other suitable device and/or software encoded on non-transitory computer-readable media for accessing network 130. Client systems 120 operating in some embodiments of the present disclosure may support downloading and storing game data from various servers. Such game data may, in turn, include information that enables various levels of offline gameplay.

The illustrated embodiment shows system 100 as including a network 130. Network 130 represents communications equipment, including hardware and any appropriate controlling logic stored on non-transitory computer-readable media, for interconnecting elements of system 100 and facilitating communication between these elements. Communications network 102 may include local area networks (LANs), metropolitan area networks (MANs), wide area networks (WANs), any other public or private network, local, regional, or global communication network, enterprise intranet, other suitable wireline or wireless communication link, or any combination thereof. Network 130 may include any combination of gateways, routers, hubs, switches, access points, base stations, and any other hardware, software, or a combination thereof that may implement any suitable protocol.

As illustrated, system 100 may include one more servers coupled to network 130, such as first social network servers 140, second social network server 145, first multiuser game server 150, and second multiuser game server 160. Social network servers 140 and 115 represent a suitable combination of hardware, software encoded on non-transitory computer-readable media, and appropriate controlling logic for hosting a social networking interface, In some embodiments, first and second social network servers 140 and 145 may include an internal multiuser game server. For example, social network server may represent FACEBOOK, MYSPACE, or some other social networking site.

On the other hand, multiuser game servers 150 and 160 represent any suitable combination of hardware, software encoded on non-transitory computer-readable media, and appropriate controlling logic for hosting a multiuser game, In some embodiments, multiuser game servers may load a game from a non-transitory computer-readable medium for execution. Each multiuser game server in system 100 may include a game engine for any and all multiuser games that it hosts or operates. Further, multiuser game servers may be configured to access social graphs for players 110 stored on social network servers 140 and 145. Similarly, some embodiments may support multiuser game server 150 and 160 to access social graphs for players stored on the other. In some embodiments, multiuser game servers 150 or 160 may also include an internal multiuser gamer server. Multiuser game servers 150 and 160 may, for example, host games such as Zynga CafeWorld, Farmville, Mafia Wars, or other multiplayer games.

The various elements of example system 100 may operate together to implement one or more aspects of the present disclosure. For example, players 110 may use one or more client system 120 to access a first multiuser game server using network 130. Alternatively, players 110 may instead initially access first social network 140 using client systems 120 over network 130. Next, players 110 may be presented with a social networking interface like those provided by FACEBOOK or MYSPACE. In turn, the social networking interface may facilitate subsequent access to one or more multiuser game servers, such as multiuser game server 150 or 160. For instance, access to one or more multiuser game servers through a social network server may be facilitated through a portal, hyperlink. or other interface for providing access to multiuser game servers. Regardless of the way in which multiuser game servers 150 or 160 are accessed, once access is granted, players 110 may be presented with a gaming interface comprising video, sound, text, and/or other multimedia. Using client systems 120, players 110 may access, and send and receive data from social network servers 140 and 145, and multiuser game servers 150 and 160 over network 130. Some embodiments may facilitate the download and storing of game logic and game state data from various servers to enable various operations, including but not limited to, offline gaining.

At the time a game is invoked or at any other later point in time after the game is operational, a game condition file may be loaded into a non-transitory computer-readable medium. A game condition file could be a file stored on a non-transitory computer-readable medium that comprises one or more game condition identifiers or indicators. The game condition file may originate from a server, such as multiuser game server 150 or 160. For example, client systems 120 may load a game condition file corresponding to a game by accessing multiuser game server 150 or 160 over network 130. The game condition file could reside locally, such as on client systems 120, or may be available remotely over network 130 from, for instance, multiuser game server 150 or 160. The game condition file may be loaded automatically on game initialization or on the occurrence of some other event. Other embodiments may, however, load the game condition file randomly, semi-randomly, or on some predetermined time interval. Once the game condition file is loaded, the game is operable to determine the value of one or more game condition identifiers or indicators located therein. This determination may be performed either on client systems 120 or on one or more servers, such as game server 150 and 160, or social network server 140 and 145. Based on this determination, players 110 may be presented with a reminder dialog on client systems 120. The reminder dialog may have instructions and/or diagrams for changing the game condition. Further, the reminder dialog may have a user response interface to enable players 110 to enter a user response corresponding to one or more game conditions. Changes to the game condition can be made to the associated game condition identifier or indicator in a game condition file based., in part, on the user response by players 100 through the user response interface. Once the game condition file is updated, it can be saved to a non-transitory computer-readable medium for later use. Such later use may include but is not limited to determining whether to present a subsequent reminder according to the teachings of the present disclosure. Thus, as illustrated elements of system 100 may coordinate and communicate with one another to provide reminders for game conditions based on a game condition file.

Figure 2:
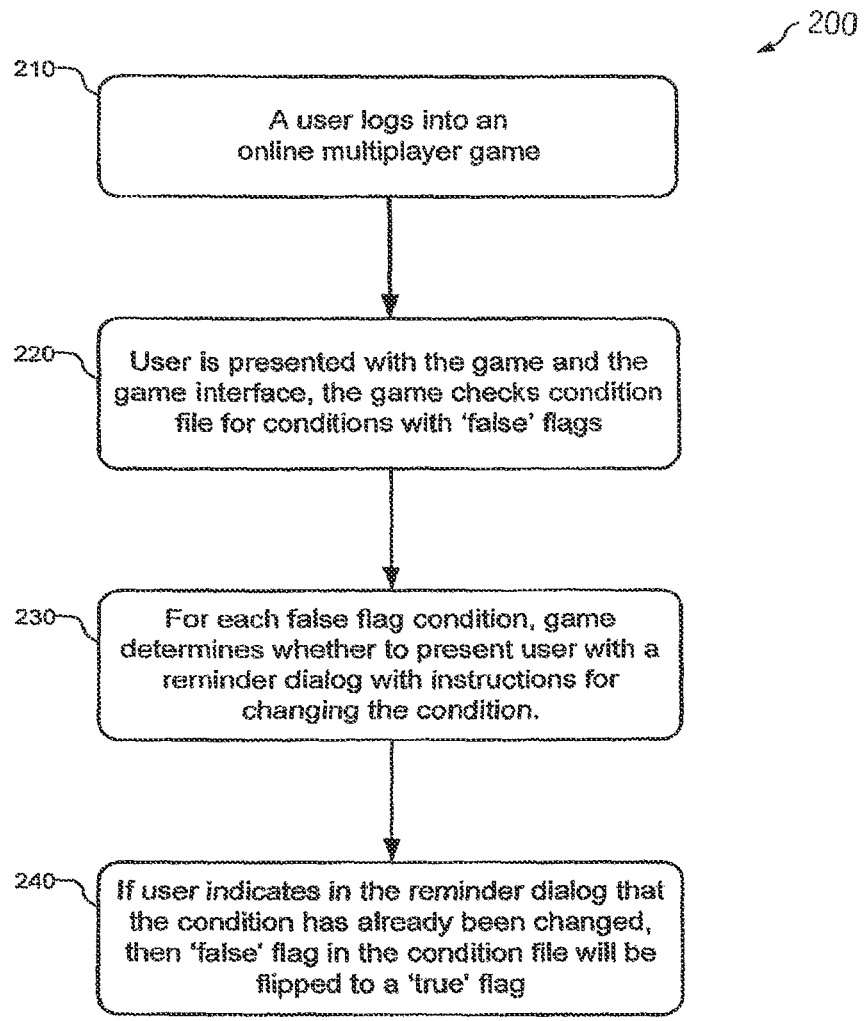
FIG. 2 illustrates an example process flow fax operating a multiuser online game using game condition reminders.

FIG. 2 illustrates a process flow 200 for operating a multiuser online game using game condition reminders for some embodiments of the present disclosure. In that regard, process flow 200 describes an example method having a number of steps for employing game condition reminders in a multiuser online game. In operation, process flow 200 begins at step 219 where a user 110 may log into an online multiplayer game a client system 120. After successfully loading and logging into the game, the user is presented with the appropriate game interface at step 220. At startup, or anytime thereafter, the game can check a game condition file for game conditions, states or statuses that have or have yet to be satisfied. As used herein, the terms "game condition," "game state" and "game status" can be used interchangeably and may refer to a Boolean value such as "TRUE" or "FALSE," or other identifiers or indicators of the particular game state, player state or other game or social network condition. As the case may be, the game may run on computer systems 120, one of the multiuser game servers 150 or 160, or some combination thereof.

The game condition file may include identifiers or indicators for various game conditions for the corresponding game or the social network. For example, a particular game condition, state, or status may indicate whether a player has bookmarked the particular game within his or her social network account. If the player has bookmarked the game, then the game condition file would reflect this game condition by, for example, designating a value of "TRUE" for the corresponding identifier or indicator of the game condition. Similarly, if the player has not bookmarked the game, then the game condition file would similarly reflect this game condition by, for example, designating a value of "FALSE" for the corresponding identifier or indicator for the game condition. Thus, when a particular game or the game server loads the game condition file in step 220, the game or the game server can check for game conditions with a particular designation or state, such as a "FALSE" value.

Next, for each game condition with the particular designation or state, such as "FALSE", the game or game server may determine whether to present a reminder dialog to the user to remind and/or instruct the user how to change the game condition. For example, if game condition file contains the aforementioned bookmark condition and it is designated as "FALSE," then the game can determine whether to present the user with a reminder dialog with a reminder and/or instructions to bookmark the game in his social network account. Reminders may include any combination of text, sound, video, or any other suitable media for raising awareness to the user of a particular game condition. In some embodiments, the determination of whether to present the user with a reminder dialog may be random, semi-random, or determined by some algorithm based on behavioral modification or other models. In other embodiments, the determination may be made by maintaining a counter that is advanced each time the condition file is read. In such embodiments, the reminder dialog may be presented to the user once the counter reaches a predetermined value or a multiple of a predetermined value. For example, a dialog box may be presented to the user each time the counter associated with the bookmark condition reaches a multiple of five and the bookmark condition remains designated as "FALSE" hi other words, the dialog box will remind the user to bookmark the game once every five times the game condition file is read, until the bookmark condition is designated as "TRUE."

As mentioned, an exemplary reminder dialog for changing a particular condition may present to the user with instructions for changing the condition in addition to presenting the reminder itself. Instructions for changing a particular condition can include text, diagrams, illustrations, screenshots or other suitable media for describing the steps necessary to alter the associated game condition using either the client computer or commands sent from the client computer to a game server or social network server. For example, the reminder dialog to bookmark the game may include instructions in the form of illustrative images of the steps necessary to bookmark the game through a web browser connected to the appropriate interface presented by social network server 140 or 145.

After receiving a reminder and acting on it, players 110 may use a response button or other suitable response interface to indicate that the user has already performed the desired user action indicated by the reminder. In particular, the game or game server may present the response buttons or other suitable response interface as part of the reminder dialog presented to players 110. The response interface provides a way for a particular player to indicate whether he has changed the game condition by performing the indicated action or steps. Thus. as illustrated, process flow 200 ends in step 240, where players 110 may use the reminder dialog interface to indicate that a specific game condition has been changed. In addition, the associated game or game server may update the game condition to reflect this change. Still further, the game servers 150 or 160 may access the social network servers 140 or 145 to determine whether the user has made a requested change. For example, many social network servers 150 or 160 provide APIs allowing authorized third-party applications to access account information of its users. In such an implementation, game servers 150 or 160 may determine whether a user has bookmarked or "fanned" a particular game and/or allowed access to the game or a subset of restricted functions, such as the ability to post messages to the user's profile page or generate activity elements to be shared with other users. As described in step 240, this may involve updating a game condition from a designation of "FALSE" to "TRUE." After updates are made to one or more game conditions, the game condition file containing the one or more game conditions may be saved on client systems 110 and/or on one or more servers, such as social network servers 140 or 145, or multiuser game server 150 or 160.

Thus, for example, some embodiments envisioned by the present disclosure might present a dialog box that asks, "Have you bookmarked the game?" In addition, the dialog box may list instructions for bookmarking the game along with user-selectable response buttons for answering the question by indicating "YES" or "NO." If the user selects "NO," then the game condition identifier designating the game condition as "FALSE" would not be changed. In that case, the game condition file is either left untouched or saved as it was originally read. However, if the user selects "YES," then the game can update the game condition flag for the game condition from "FALSE" to "TRUE" within the game condition file. The now updated game condition file can then be saved for the next time a game condition file is retrieved by the game. When the game condition file is subsequently accessed, the system will recognize that the game condition is designated as "TRUE" in the game condition file. As a result, the game may decide, for example, not to issue any further reminders.

Figure 3:
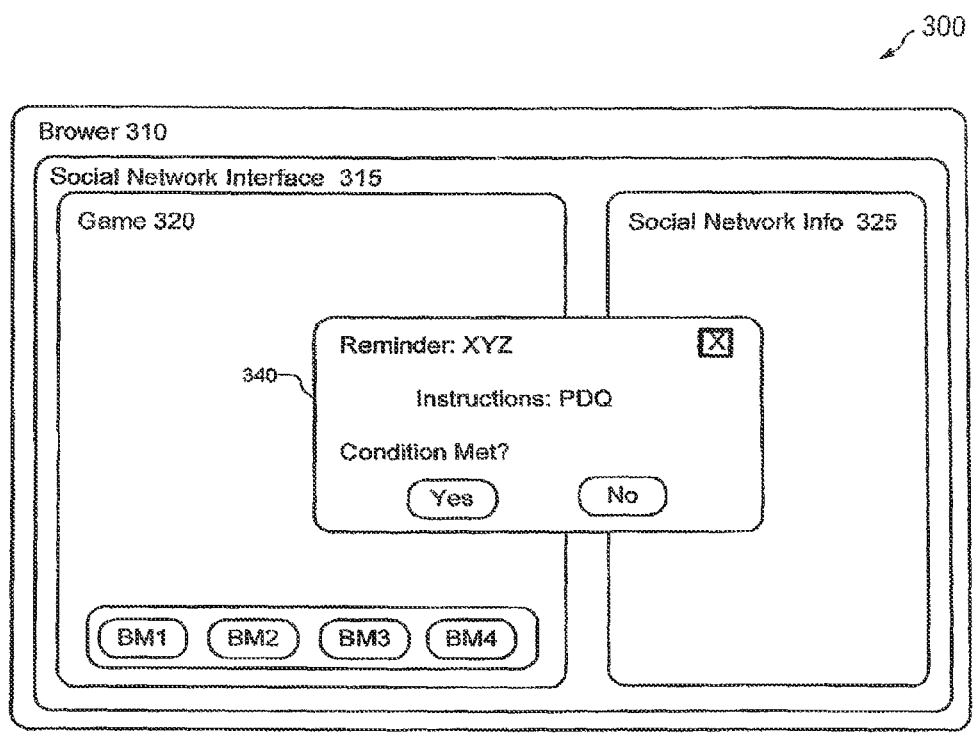
FIG. 3 illustrates an example game condition reminder for a game in an API/social network infrastructure.

FIG. 3 illustrates an exemplary user interface 300 for a multiuser game operating in the context of a social network and accessed through a web browser. Thus, for example, a browser 310 may facilitate access to a social network interface 315, which in turn presents a user interface for a game 320 while also displaying social network information 325, Game 320 may operate in conjunction with a game condition file. As discussed, a game condition file may include game condition identifiers or indicators that may correspond to whether a user has performed an desired action or some other defined game condition. The game condition identifier or indicator may have values such as "TRUE" or "FALSE," or "1" or "0," or any other appropriate indication as to whether the game condition has been satisfied. Once game 320 is invoked or otherwise initialized, game 320 may read a game condition file including one or more game condition identifiers or indicators. Alternate embodiments may involve game 320 randomly, semi-randomly, or algorithmically determining when to read the game condition file.

Regardless of when game 320 loads the game condition file, once loaded, game 320 can determine the state of a game condition by accessing the corresponding game condition identifier or indicator, in other words, game 320 may read a game condition identifier or indicator to determine whether to present a corresponding reminder dialog 340. Game 320 may decide to present the user with a reminder dialog 340 because, for example, the game condition is in a state indicating that the game condition has not been satisfied (e.g. "FALSE" or "0"). Not only can game 320 present the reminder dialog, but it may also display appropriate instructions for changing the condition. As discussed, the reminder dialog may also include a response interface, such as clickable buttons, for receiving a user response. The user response could indicate whether the user of game 320 has changed the relevant game condition. Depending on the design of the social network interface 315 and social network information 325, the game may be able to verify whether the user has indeed performed desired activity corresponding to the game condition. So, for example, in an embodiment having a social network interface and/or social network information that facilitates verification of user actions, a game 320 would be able to determine whether a user has bookmarked the game, invited others to play the game, become a fan of the game, or some other desired action associated with the game and the social network. To facilitate verification of user activity, embodiments of the present disclosure may access user account information for the user in a social network to determine whether the user has performed an action in the social network associated with the game. In certain embodiments, relevant user account information may be hosted on a remote social networking system, such as social network server 150 or 160.

In those embodiments that support user activity verification, a user might still indicate whether he has performed the desired action by, for instance, clicking "YES" or "NO." Then, depending on game design, game 320 may or may not change the game condition identifier or indicator in the game condition file. Thus, game 320 can determine whether to display a reminder dialog 340 again based on the received user response and whether the user actually changed the game condition. Such functionality may be used to further encourage the user to actually change the game condition by performing the desired action. So, for example, a user might be presented with a subsequent reminder dialog 340 to add a bookmark for game 320 within their social network interface 315, even though the user has already indicated that he has bookmarked game 320 in a previous user response while not actually doing so. In other embodiments that do not facilitate game condition verification, a user may similarly use to the response interface to indicate that he has performed an action even though he has not actually changed the game condition. Such embodiments may update the game condition file to reflect that the game condition has been changed, and consequently the user may no longer receive reminder dialogs for that condition.

Figure 4:
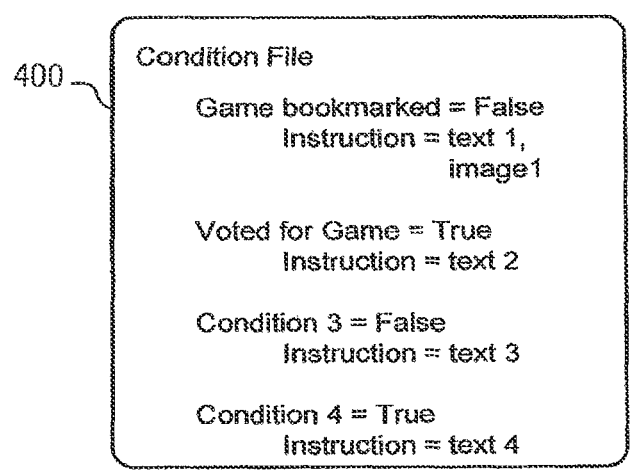
FIG. 4 illustrates a graphical representation of an example game condition file.

FIG. 4 graphically illustrates an example game condition file 400 including several game and social network conditions. Game condition file 400 represents any suitable computer-readable and/or human-readable file formats stored on a non-transitory computer-readable medium that facilitate reads and writes by games, such as game 320, to determine whether to display reminders according to the teachings of the present disclosure. Some example file formats for the game condition file 400 may include base64 files, binary file, text files, or any other appropriate file type. As shown, each game condition has an associated identifier or indicator to indicate whether that game or social network condition has changed, For example, an identifier may take on a value of either "TRUE" or "FALSE," where "TRUE" indicates the game or social network condition has been changed by the user and "FALSE" indicates that the game or social network condition has not been changed by the user. Using these game or social network condition identifiers, games like game 320 can assess whether, when, and how often to display reminders and/or reminder-related functionality as disclosed herein.

Figure 5:
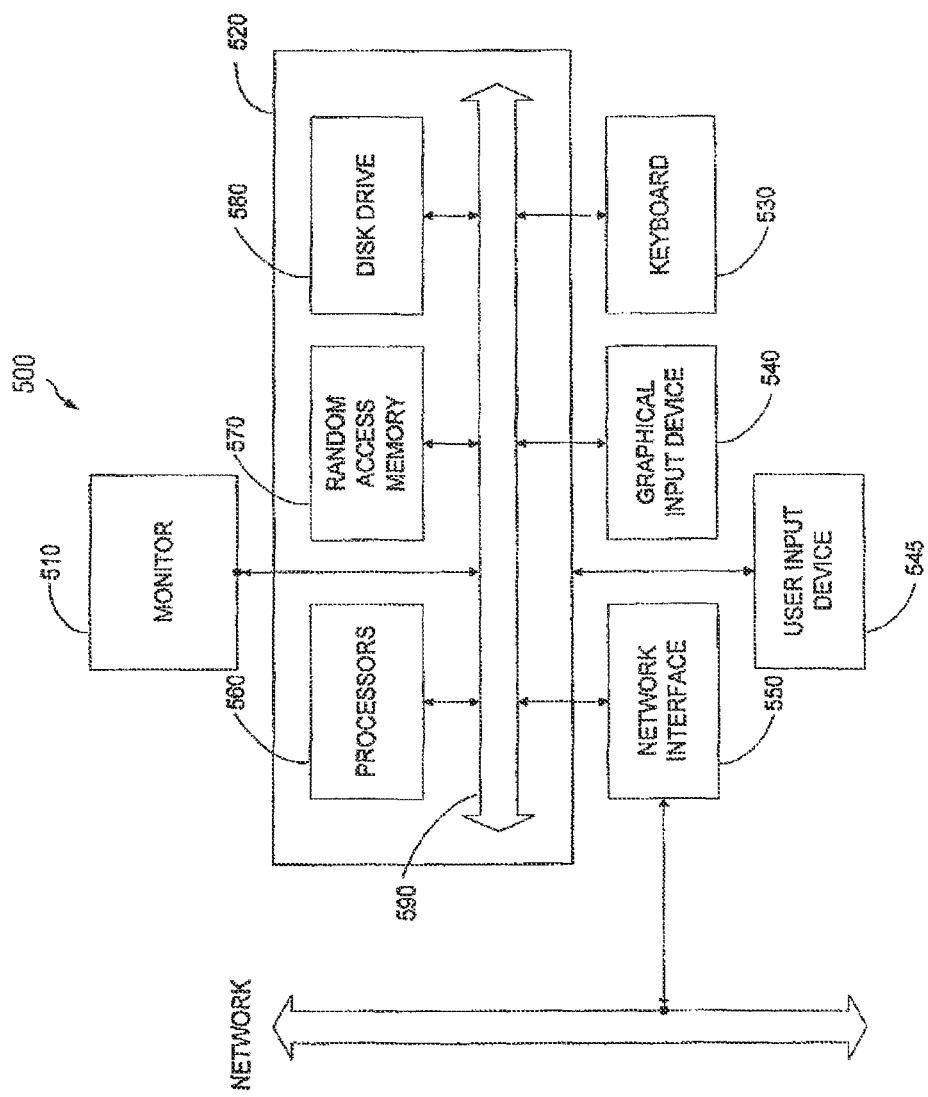
FIG. 5 illustrates a schematic view of an example computer system that may be employed by some embodiments of the present disclosure.

FIG. 5 is a representative computer system that may be employed by some embodiments of the present disclosure. Other hardware and software configurations other than those shown may also be suitable for practicing various embodiments. For example, the computer may be a desktop, portable, rack-mounted or tablet configuration. Similarly, the computer may be a series of networked computers. Further, the use of one or more microprocessors are contemplated, such as Xeon™, Pentitium™ or Core™ microprocessors; Turion™ 134, Opteron™ or Athlon™ microprocessors from Advanced Micro Devices, Inc., and the like. Further, various types of operating systems arc contemplated, such as Windows®, WindowsXP®, WindowsNT®, or the like from Microsoft Corporation, Solaris from Sun Microsystems, LINUX, UNIX, and the like, In still other embodiments, the techniques described above may be implemented on a chip or an auxiliary processing board. Various embodiments may be based upon systems provided by daVinci, Pandora, Silicon Color, or other vendors.

As illustrated, computer system 500 represents a collection of hardware, software, and control logic for implementing aspects of the present disclosure. For example, client systems 120, social network servers 140 and 145, and/or multiuser game servers 150 and 160 may be embodied in a computer system like computer system 500. As shown, computer system 500 may include a display 510, computer 520, a keyboard 530, a graphical input device 540, a user input device 545, computer interfaces 550, and other appropriate components.

Display 510 represents any interface for displaying content in a human-readable format to the user. For example, in some embodiments, display 510 may be embodied as a cathode ray tube (CRT) display, a liquid crystal display (LCD) device, a plasma display, a direct-projection or rear-projection digital light processing (DLP) display, a microdisplay, or the like. In various embodiments, display 510 may be used to display user interfaces and rendered images.

Graphical input device 540 represents any user interface that facilitates data entry or otherwise permits users to interact with computer system 500 as information is displayed on display 510. Graphical input device 540 may be embodied in a computer mouse, a trackball, a track pad, a joystick, wireless remote, drawing tablet, voice command. system, eye tracking system, and the like. Graphical input device 540 may support selecting objects, icons, text and the like via a user command such as a click of a button or pressing a key on the keyboard, or the like. Some embodiments may incorporate the use of a specialized user input device 545. User input device 545 may include a number of image capturing devices or image capturing systems. In other embodiments, user input device 545 may include additional computer system displays e.g. multiple monitors). Further, user input device 545 may be implemented as one or more graphical user interfaces on such displays or on display 510.

Network interfaces 550 represents any computer interface operable to connect to other components of the present disclosure, or other computer systems or networks. For example, network interfaces 550 may include an Ethernet card, a wireless interface, a modem (telephone, satellite, cable, ISDN), (asynchronous) digital subscriber line (DSL) unit, FireWire interface, USB interface, and the like. For example, network interfaces 550 may be coupled to a computer network, to a FireWire bus, or the like. In other embodiments, network interfaces 550 may be physically integrated on the motherboard of computer 520, may be a software program, such as soft DSL, or the like.

Random Access Memory (RAM) 570 and disk drive 580 represent exemplary forms of non-transitory computer-readable media configured to store instructions or data. RAM 570 and disk drive 580 may store objects, game logic, executable code, software, control logic, descriptor files, game condition files, application programming interfaces, a rendering engine, social networking profiles, and the like. Non-transitory computer-readable media may include volatile and non-volatile magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

Computer 520 of computer system 500 represents a set of computer components such as a processor 560, and memory storage devices, such as a random access memory (RAM) 570, disk drives 580, and system bus 590 interconnecting these various components. Computer 520 may be a stand alone system or may work in conjunction with other components of system 500 to implement various aspects of the present disclosure. In some embodiments, computer 520 includes one or more Xeon microprocessors from Intel. Further, computer 520 may include a UNIX -based or other suitable operating system.

Computer system 500 may also include software that enables communications over a network such as the HTTP, TCP/IP, RTP/RTSP protocols, and the like. Other embodiments may include alternate or other communications software and transfer protocols, for example IPX, UDP or the like, as appropriate. Some embodiments of computer system 500 may include a graphical processor unit (CPU) to accelerate various operations including color grading, automatically performing a gamut remapping, or the like.

Figure 6:
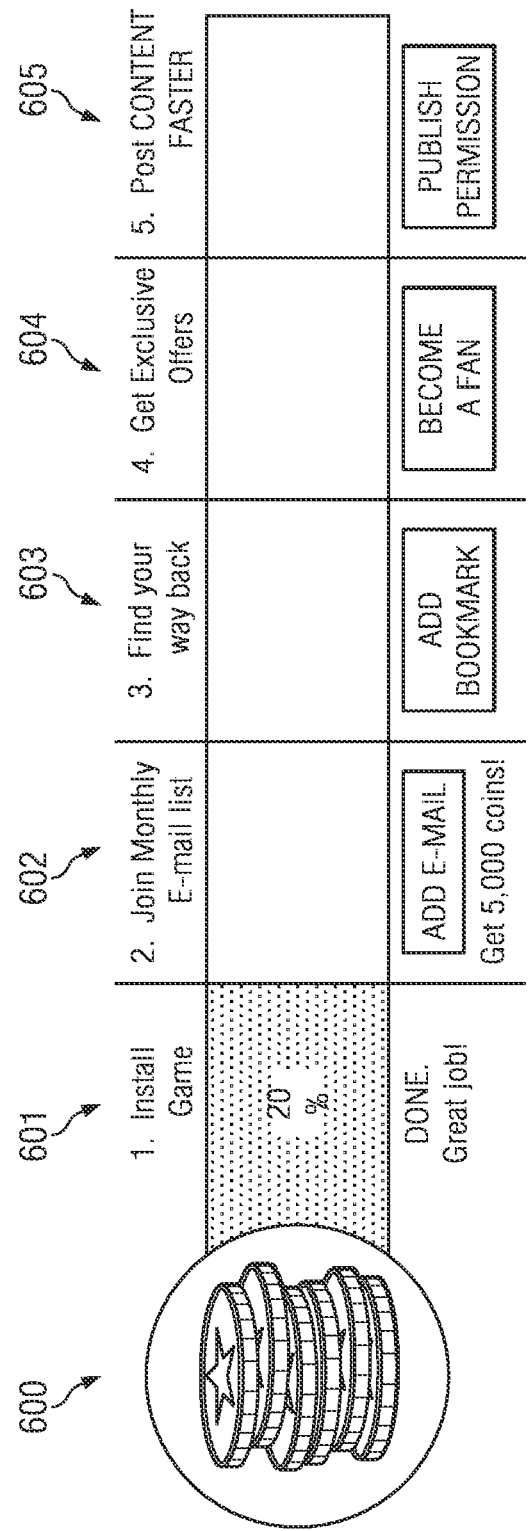
FIG. 6 illustrates an example progress bar for reminding users to perform certain game-related activities.

FIG. 6 illustrates an example progress bar 600 for reminding users to perform certain game-related activities. As shown, progress bar 600 consists of five requested tasks 601-605. The progress bar 600 visually represents a user's progress in completing these requested tasks by, for example, showing a percentage of completed tasks to all requested tasks and/or shading a corresponding portion of the progress bar 600. The progress bar 600 also reminds and encourages users to perform the uncompleted tasks by providing incentives and an interface for completing unfinished tasks. Depending on game design, progress bar 600 may be displayed at game startup, periodically throughout the game, continuously as the game is played, or on the occurrence of some game or social network event. As a user completes the various requested tasks 601-605, progress bar 600 may be updated to reflect those events and further encourage the completion of any unfinished requested tasks. A progress bar such as progress bar 600 may advantageously encourage user action in a social network where an established policy prohibits a game from directly acquiring information from a user's social network account or directly altering information therein.

As illustrated, the user has already completed requested task 601 by installing the game. Progress bar 600 indicates completion of requested task 601 by shading the corresponding portion of the task bar, indicating that twenty percent of all the requested tasks are complete, and complimenting the user on completing the requested task 601. Requested tasks 602-605 represent uncompleted requested tasks. For example, requested task 602 seeks to remind a user to join a monthly email list and requests that the user supply their email address. As shown for requested task 602, progress bar 600 may encourage user action by providing an incentive, such as awarding five thousand. coins, for completing the uncompleted requested task of providing an email address. As another example, requested task 603 reminds and encourages a user to add a bookmark to a game within a social network. Similarly, requested task 604 suggests that a user become a fan of the game within the social network and get exclusive offers. The final requested task in progress bar 600, shown as requested task 605, seeks permission from a user fix a game to publish game-related events to a social network. Once each of these requested tasks are completed, progress bar 600 is updated to reflect the change and further encourage the completion of any remaining uncompleted tasks.

While the various figures illustrate certain embodiments as including specific components, it should be understood that various embodiments may operate using any suitable arrangement and collection of components to practice the teachings of the present disclosure. Likewise, although the present disclosure describes several embodiments, it should be understood that various changes, substitutions, and alterations can be made without departing from the spirit and scope of the present disclosure, as defined by the appended claims.

What is claimed is:

1. A computer-implemented method comprising:
    accessing, from a memory of a game server, a game condition identifier associated with a game condition for a user of an online game of the game server, the game condition associated with a bookmarking action performed via a social network account associated with the user and the bookmarking action performed external to the online game;
    determining a value associated with the game condition identifier;
    determining, using one or more processors, whether the performance of the bookmarking action by the user is required with respect to the game condition based on the value associated with the game condition identifier;
    determining whether to remind the user of the game condition based on a criterion additional to the value associated with the game condition identifier;
    in response to determining that the user is to be reminded of the game condition:
        generating a reminder associated with the game condition, the reminder including a user response interface allowing the user to indicate whether the user has previously performed the game condition;
        presenting the reminder to the user;
        receiving a response from the user indicating whether the user has previously performed the game condition; and updating the game condition identifier if the response from the user indicates that the user has previously performed the game condition.

2. The method of claim 1, wherein the additional criterion includes a random element.

3. The method of claim 1, wherein determining whether to remind the user of the game condition includes identifying an elapsed time since a previous reminder was presented to the user.

4. The method of claim 3, wherein the user is to be reminded of the game condition if the elapsed time exceeds a predetermined time interval.

5. The method of claim 1, wherein the additional criteria is a value of a counter, the method further comprising incrementing the counter each time the value associated with the game condition identifier is determined.

6. The method of claim 5, wherein the user is to be reminded of the game condition if the value of the counter exceeds a predetermined value.

7. The method of claim 5, wherein the user is to be reminded of the game condition if the value of the counter reaches a multiple of a predetermined value.

8. The method of claim 1, wherein the reminder associated with the game condition includes instructions for performing the game condition.

9. The method of claim 1, wherein the reminder associated with the game condition includes a plurality of images indicating how to perform the game condition.

10. The method of claim 1, wherein the game condition includes inviting at least one friend to join the online game.

11. The method of claim 1, wherein the game condition includes granting permission to the online game to post activities associated with the user to a social network.

12. The method of claim 1, wherein the game condition includes a plurality of user tasks.

13. The method of claim 12, further comprising presenting the plurality of user tasks to the user through a progress bar.

14. A computer-implemented method comprising:
presenting a request to a user of an online game to perform a bookmarking action associated with and external to the online game;
accessing, from a memory of a game server, a game condition identifier from a game condition file, the game condition identifier associated with a game condition for the user of the online game of the game server, the game condition associated with the requested bookmarking action performed via a social network account associated with the user, the requested bookmarking action performed external to the online game;
determining a value associated with the game condition identifier;
determining, using one or more processors, whether the performance of the requested bookmarking action by the user is required with respect to the game condition based on the value associated with the game condition identifier;
determining, whether to remind the user of the game condition based on a criterion additional to the value associated with the game condition identifier;
in response to determining that the user is to be reminded of the game condition:
generating a reminder associated with the game condition, the reminder including a user response interface allowing the user to indicate whether the user has performed the game condition;
presenting the reminder to the user;
receiving a response from the user indicating whether the user has performed the game condition; and
updating the game condition identifier if the response from the user indicates that the user has performed the game condition.

15. The method of claim 14, wherein determining whether to remind the user of the game condition includes identifying an elapsed time since a previous reminder was presented to the user.

16. The method of claim 15, wherein the user is to be reminded of the game condition if the elapsed time exceeds a predetermined time interval.

17. The method of claim 14, wherein the additional criteria is a value of a counter, the method further comprising incrementing the counter each time the game condition identifier is accessed from the game condition file.

18. The method of claim 17, wherein the user is to be reminded of the game condition if the value of the counter exceeds a predetermined value.

19. An apparatus comprising:
a network interface to communicate with a user of an online game;
a memory of a game server of the online game, the memory configured to store a game condition identifier associated with a game condition for a user of the online game, the game condition associated with a bookmarking action performed via a social network account associated with the user and the bookmarking action performed external to the online game; and
one or more processors coupled to the network interface and the memory, the one or more processors configured to:
access the game condition identifier from the memory;
determine a value associated with the game condition identifier;
determine whether the performance of the bookmarking action by the user is required with respect to the game condition based on the value associated with the game condition identifier;
determine whether to remind the user of the game condition based on a criterion additional to the value associated with the game condition identifier, in response to determining that the user is to be reminded of the game condition:
generate a reminder associated with the game condition, the reminder including a user response interface allowing the user to indicate whether the user has previously performed the game condition;
present the reminder to the user;
receive a response from the user indicating whether the user has previously performed the game condition; and
update the game condition identifier if the response from the user indicates that the user has previously performed the game condition.

* * * * *